April 28, 1970  E. P. SIMONSON  3,508,774
SAFETY NUT ASSEMBLY
Filed Sept. 26, 1968

INVENTOR.
EUGENE P. SIMONSON
BY Andrew L. Ney
ATTORNEY

United States Patent Office 3,508,774
Patented Apr. 28, 1970

3,508,774
SAFETY NUT ASSEMBLY
Eugene P. Simonson, Glenside, Pa., assignor to Standard Pressed Steel Co., Jenkintown, Pa., a corporation of Pennsylvania
Filed Sept. 26, 1968, Ser. No. 762,919
Int. Cl. F16b 5/02, 1/00, 7/18; F16l 5/00, 15/00
U.S. Cl. 287—189.36                2 Claims

ABSTRACT OF THE DISCLOSURE

An assembly having a washer loosely carried by a nut at one end of the nut. The nut has a counterbore at its endface adjacent the washer. The washer forms a lip at the open end of the counterbore of the nut. The assembly is arranged to receive a circumferentially compressible collar carried by a bolt as it is turned into the nut. The lip formed by the washer compresses the collar to permit the collar to enter into the counterbore of the nut to be captivated within the counterbore and also to be removed from the counterbore.

---

Figure 1:
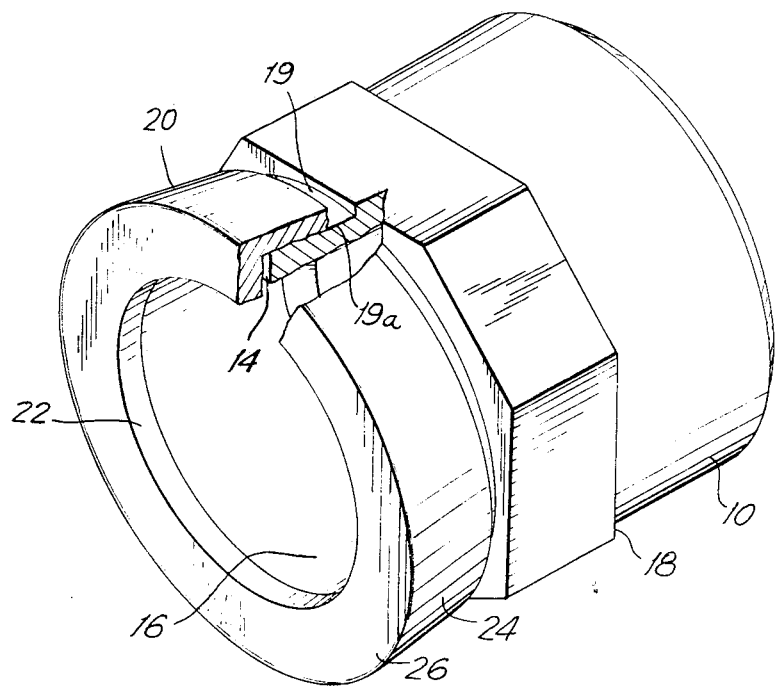

The present invention relates to fasteners arranged to retain a bolt in a bolt hole in the event that a nut turned onto the bolt threads tends to back off of the bolt due to vibrations.

At the present time, it is common in both commercial and military aircraft to require in certain critical applications where vibrations tend to become a problem that the fastening system employed provide what is known as a "belt and suspenders" effect. Besides the threaded engagement between a nut and a bolt, additional means are provided to resist the tendency of the two to become separated as the system is subjected to vibrations. For example, the nut may be castellated and the bolt provided with a diametral hole so that a cotter pin may be used to prevent the nut from backing off of the bolt. Dependent upon the application, the fastening system may have one or more degrees of added protection against separation of the fastener devices and the structural members being secured together.

Among the problems with devices and techniques employed in the past to provide these added safeguards against joint separation are undesirably high cost in the fabrication and installation of the fastening systems and complexity in the arrangement of the component parts. In addition, in certain instances in the past, the fastening systems were not sufficiently fool-proof and were very susceptible to the possibility that a workman installing the fastener system might omit to install a particular part vital to the integrity of the joint.

Accordingly, it is an object of the present invention to provide a new and improved fastener system which provides added protection against the separation of a joint subjected to vibrations.

It is another object of the present invention to provide a fastening system which is relatively simple in construction and inexpensive to fabricate.

It is a further object of the present invention to provide a fastening system which overcomes the shortcomings and limitations of presently available comparable devices.

These objects, as well as others, are achieved according to a preferred embodiment of the present invention by providing a nut assembly which includes a nut member having an internally threaded bore spaced from a first end of the nut member by a counterbore. A washer member is loosely fitted on the first end of the nut member so that the washer member may move radially and axially of the nut member. The washer member has a central opening forming a lip at the open end of the counterbore which defines a passage into the counterbore of the nut member.

For a better understanding of the present invention, together with other and further objects thereof, reference is made to the following description, taken in connection with the accompanying drawing, and its scope will be pointed out in the appended claims.

Figure 2:
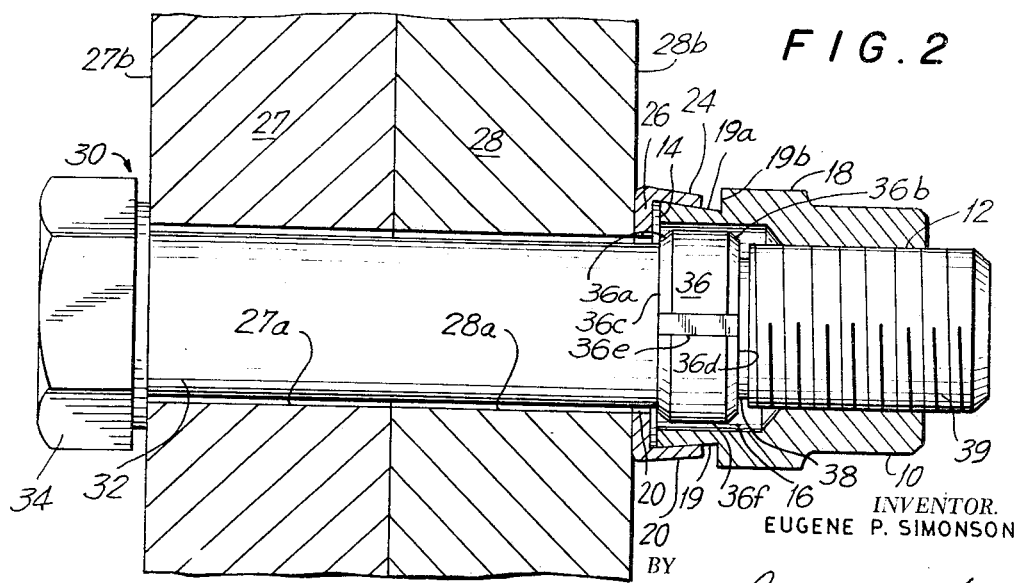

Referring to the drawing:

FIGURE 1 is a perspective view, partially broken away, of a preferred embodiment of a nut assembly constructed in accordance with the present invention; and FIGURE 2 is a vertical view, partially in section, of a joint assembled in accordance with the present invention.

Referring to the drawing, a nut assembly constructed in accordance with the present invention includes a nut member 10 having an internally threaded bore 12 spaced from an end 14 of the nut member by a counterbore 16. The external surface of nut member 10 is adapted to be engaged by a suitable wrenching tool. Wrench engaging surfaces may be provided on the nut member in the area of threaded bore 12 or the enlarged area 18 between the threaded bore and end 14, as illustrated.

A washer member 20 is loosely fitted on nut member 10 at end 14. This washer member has a central opening 22 forming a lip at the open end of counterbore 16 of nut member 10. Opening 22 of the washer member defines a passage into counterbore 16.

Washer member 20 is generally cup-shaped and includes a first annular section 24 fitted against the sidewall of nut member 10. A second annular section 26 is disposed perpendicular to the longitudinal axis of the nut member. Washer member 20 is fitted onto nut member 10 by means of annular section 24 fitting into a groove 19 provided in the sidewall of the nut member. Groove 19 includes an inclined surface 19a which slopes inward from end 14 of the nut member toward the axis of the nut member and a shoulder 19b. Annular section 24 of the washer member is shaped in a corresponding manner so as to fit against inclined surface 19a and slide along this surface. The inside dimensions of annular section 24 of the washer member and the outside dimensions of inclined surface 19a are such that washer member 20 may move radially and axially of nut member 10.

FIGURE 2 illustrates the manner in which two structural members 27 and 28 may be secured together in accordance with the present invention. Members 27 and 28 are positioned adjacent one another with holes 27a and 28a aligned so as to provide a clear passage from outside surface 27b of member 27 to outside surface 28b of member 28. Members 27 and 28 are secured together by a bolt assembly 30 and the nut assembly comprising nut member 10 and washer member 20. Bolt assembly 30 includes a bolt having a threaded shank 32 extending through holes 27a and 28a and an enlarged head 34 bearing against outside surface 27b of member 27. The bolt carries a circumferentially compressible spring collar 36 in an annular groove 38 positioned at or adjacent the thread runout of the bolt and at a distance from bolt head 34 which is slightly greater than the grip length of the joint. As a result, as the bolt is inserted into the passage formed by holes 27a and 28a, collar 36 is compressed circumferentially to permit its passage through members 27 and 28. After collar 36 exits from surface 28b, it returns to its uncompressed state to a point where it is larger than the diameter of the holes through which it has passed. Such expansion positions and retains the bolt in members 27 and 28 even though the bolt is disengaged from the nut assembly.

To facilitate the insertion of the bolt into members 27 and 28, collar 36 is provided with an external surface having first and second frusto-conic sections 36a and 36b separated by a cylindrical section 36f. Frusto-conic section 36a has a top defining an edge 36c of the collar which is presented toward bolt head 34, while frusto-conic section 36b has a top defining a second edge 36d of the collar which is presented toward the bolt threads 39. The diameters of the tops of frusto-conic sections 36a and 36b are equal to each other and when collar 36 is uncompressed, they are equal to or slightly less than the diameter of holes 27a and 28a. The maximum external diameter of the uncompresed collar is greater than the diameter of holes 27a and 28a so that upon engagement of the collar with surface 28b, the bolt is retained. The maximum external diameter of the circumferentially compressed collar is less than the diameter of holes 27a and 28a so that the collar may pass through these holes. Collar 36 is provided with a slot 36e throughout the axial extent of the collar of sufficient width to provide for the required circumferential compressibility of the collar.

Once the bolt assembly is installed in members 27 and 28, the nut assembly may be turned onto threads 39 of the bolt. As this occurs, the opening 22 of washer member 20 engages frusto-conic section 36b of collar 36. This causes collar 36 to be compressed circumferentially until the annular section 26 of the washer member passes over cylindrical section 36f of the collar. At this point, the collar is within the counterbore 16 of nut member 10 and because the diameter of the counterbore is greater than the maximum external diameter of the uncompressed collar, collar 36 is permitted to assume its uncompressed state.

The various bearing surfaces of collar 36 and the opening 22 of the washer member are arranged to offer two degrees of added resistance to joint separation in the even that the nut assembly tends to back off of bolt 30 and yet present surfaces which facilitate the insertion of the bolt and the seating of the nut assembly without the need of additional tools for compressing the collar. The relationship between the ease of installation and resistance to joint separation is dependent upon the angles of the various inclined surfaces of collar 36 and may be changed from one application to the next. For the embodiment illustrated, the angles of surfaces 36a and 36b of the collar are the same. Surface 36a of the collar may be made to have a steeper incline than surface 36b if it is desired to arrange the system to be more difficult to disassemble than to assemble.

The provision of a lip for the counterbore 16 results in a two-fold retention of the bolt by the nut assembly as the nut assembly is being seated. In contrast, in certain present day practices, for example, with the use of cotter pins, the final degree of protection against joint separation is provided after the nut is seated. In the event that the assembler fails to carry out this last step of installing the cotter pin, the added protection provided for in the system is, in fact, not provided. In the present invention, this problem is avoided and the provision of a final degree of protection does not require an additional assembly operation.

The diameter of opening 22 in washer member 20 is selected to provide sufficient clearance for collar 36 of the bolt to pass through, yet at the same time, this opening is made as small as possible to provide maximum overhang of the lip of the washer member to oppose undesired back-off of the nut assembly from the bolt. Because washer member 20 is arranged to float on nut member 10 so that the washer member may move radially relative to the nut member, the eccentricities of the mating threads of the bolt and nut member do not have to be compensated for by enlarging the diameter of opening 22 in the washer member. This condition between the mating threads is accommodated by the relative movement provided for in the two parts of the nut assembly.

A further advantage of providing a minimum opening in the washer member is that maximum bearing area is retained between the workpiece and the nut assembly.

The provision of a washer member which floats on the nut member also protects against scoring or marring of the workpiece. As the joint is being clamped, the bearing end of the nut member turns against the inside of the washer member and not against the workpiece.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A joint comprising:
a stack of members positioned adjacent one another and having a hole extending from a first outside surface of said stack to a second outside surface of said stack;
a self-retained bolt assembly including a bolt having a threaded shank extending through said hole in said stack and an enlarged head bearing against said first outside surface of said stack, said bolt also having radially compressible retaining means carried by said bolt at or adjacent the thread runout and at a distance from said bolt head which is greater than the length of said hole in said stack, the maximum external dimension of the uncompressed retaining means being greater than the diameter of said hole through said stack, the maximum external dimension of the radially compressed retaining means being no greater than the diameter of said hole through said stack;
and a nut assembly having a nut member and a washer member, means loosely fitting said washer member on a first end of said nut member, said nut member having an internally threaded bore turned onto said bolt threads and spaced from said first end by a counterbore within which said bolt retaining means are located as said washer member bears against said second outside surface of said stack, the diameter of said counterbore being greater than said maximum external dimension of the uncompressed retaining means, said washer member having a central opening forming a lip at the open end of said counterbore and defining a passage into said counterbore with a diameter greater than the maximum external dimension of the radially compressed retaining means and less than the maximum external dimension of the uncompressed retaining means;
said retaining means of said bolt and said lip of said nut assembly having surface means cooperating with each other to compress said retaining means upon engagement of said retaining means and said lip as said nut assembly is turned onto said bolt threads and removed from said bolt threads, said surface means on at least one of said retaining means and said lip having first and second surfaces inclined relative to the axis of said bolt and disposed in opposite directions toward said bolt head and said bolt threads and toward said surface means on the other part as said nut assembly is turned onto said bolt threads and removed from said bolt threads.

2. A joint according to claim 1 wherein said retaining means include a circumferentially compressible spring collar carried by said bolt in an annular groove positioned at or adjacent the thread runout and at a distance from said bolt head which is greater than the length of said hole in said stack, the bolt diameter along the groove being less than the shank diameter, the external surface of said collar including first and second frusto-conic sections positioned with said first frusto-conic section having a top defining an edge of said collar which is presented toward said bolt head and said second frusto-conic section having a top defining a second edge of said collar which is presented toward the bolt threads, the diameters of said tops of said frusto-conic sections being equal to each other and when the collar is uncompressed being equal to or slightly less than the diameter of said hole through said stack, the bore diameter of the uncompressed collar being larger than the groove diameter, the maximum external diameter of the uncompressed collar being greater than the diameter of said hole through said stack, the maximum external diameter of the circumferentially compressed collar is no greater than the diameter of said hole through said stack, and said collar having a slot throughout the axial extent thereof of sufficient width to provide for the circumferential compressibility.

References Cited

UNITED STATES PATENTS

| | | | |
|---|---|---|---|
| 2,643,573 | 6/1953 | Johnson | 151—69 |
| 3,181,413 | 5/1965 | Wing | 85—32 |
| 3,412,774 | 11/1968 | Schuster | 151—69 |
| 3,421,563 | 1/1969 | Koss | 85—62 |

FOREIGN PATENTS 1,315  2/1901  Great Britain.

EDWARD C. ALLEN, Primary Examiner